Figure 7:
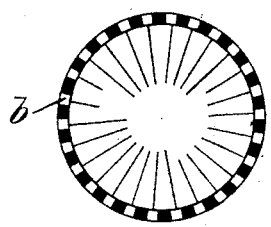

No. 622,636. Patented Apr. 4, 1899.
H. A. ROWLAND.
SYSTEM OF MULTIPLEX TELEGRAPHY.
(Application filed Apr. 27, 1896.)
(No Model.) 9 Sheets—Sheet 1.
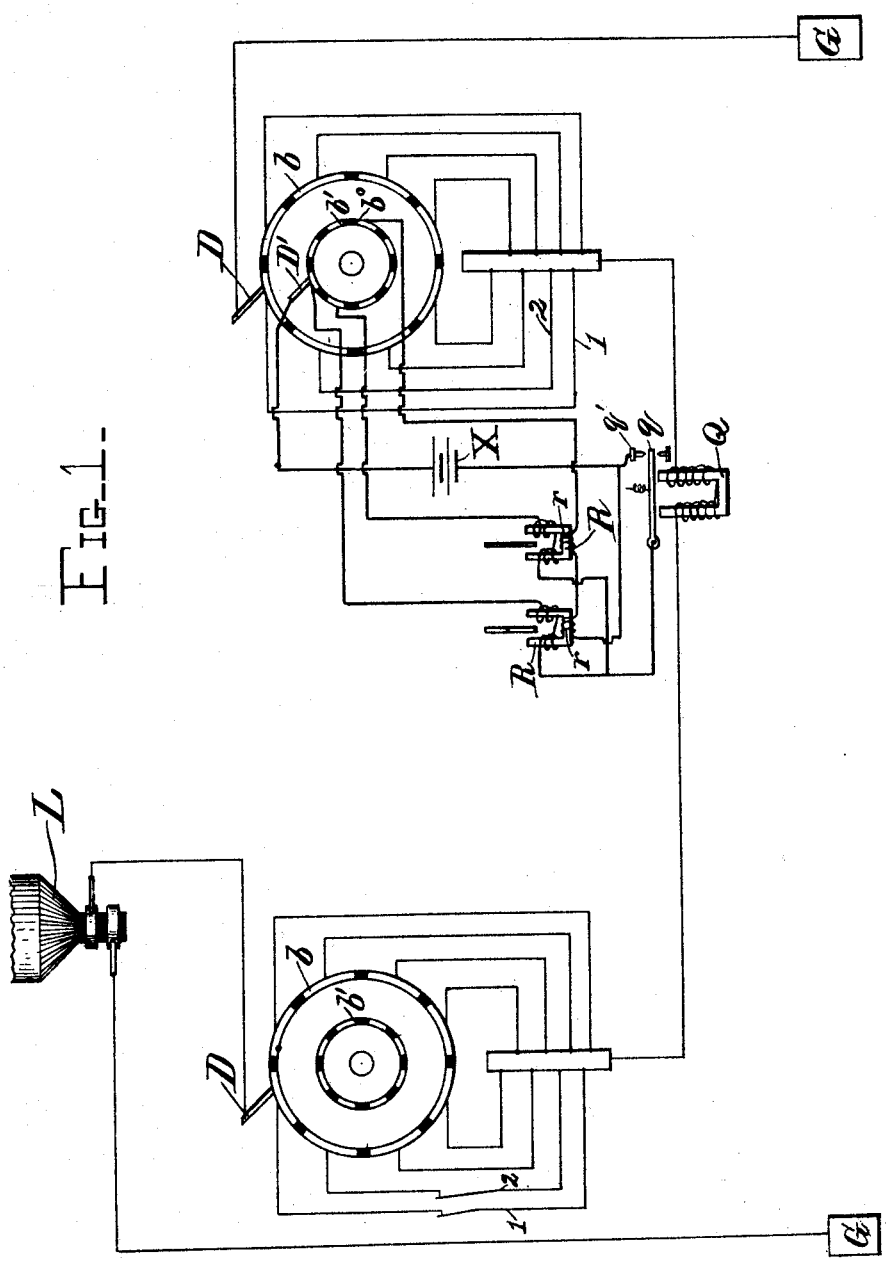

No. 622,636. Patented Apr. 4, 1899.
H. A. ROWLAND.
SYSTEM OF MULTIPLEX TELEGRAPHY.
(Application filed Apr. 27, 1896.)
(No Model.) 9 Sheets—Sheet 2.
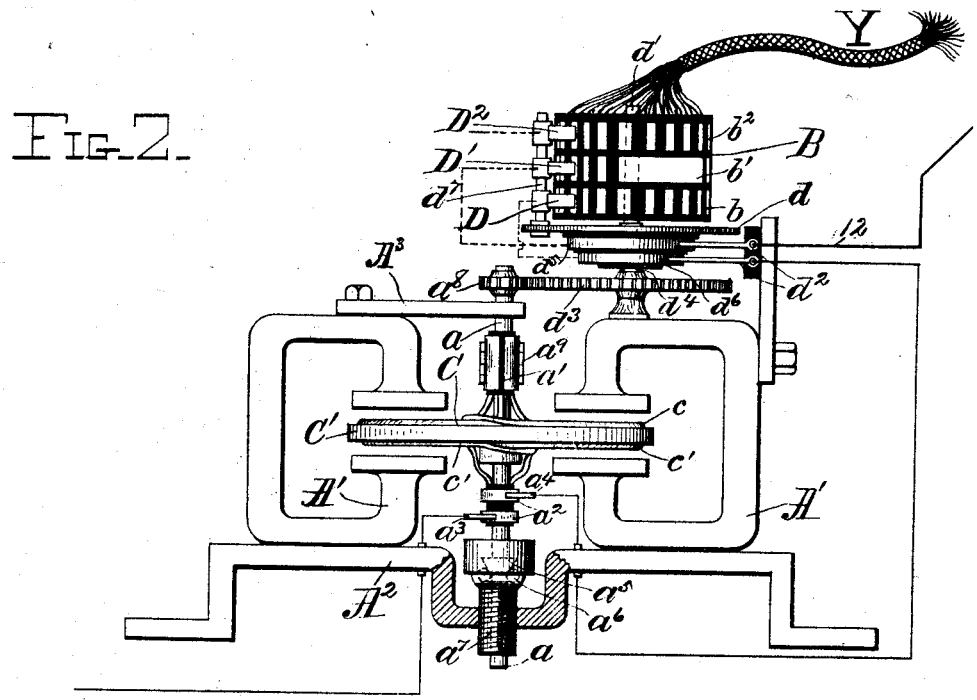
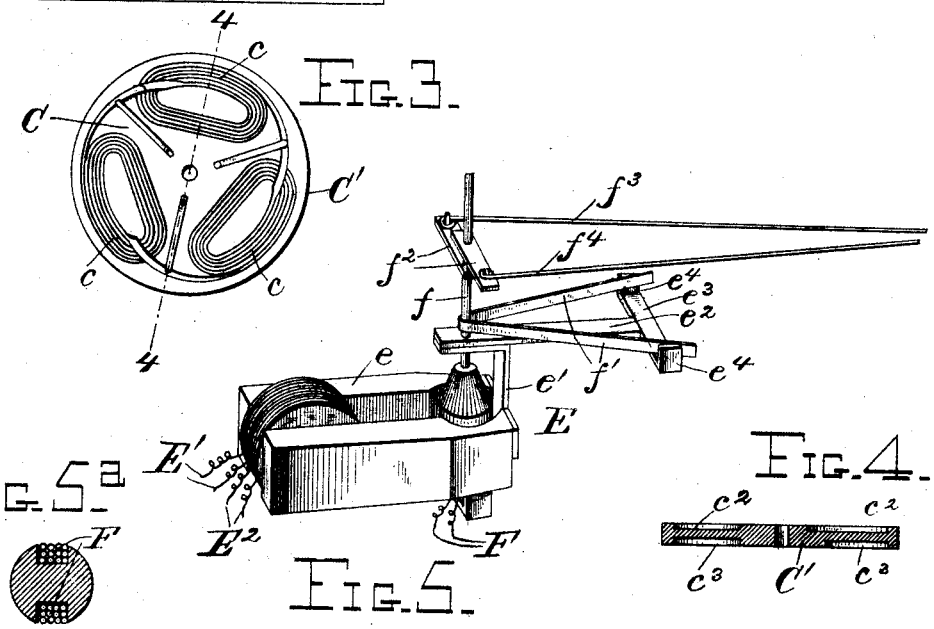
Witnesses
John H. Holt.
J. Stephen Ginsta
Inventor
Henry A. Rowland,
By Whitman & Wilkinson,
Attorneys.

No. 622,636.  
H. A. ROWLAND.  
SYSTEM OF MULTIPLEX TELEGRAPHY.  
(Application filed Apr. 27, 1896.)

Patented Apr. 4, 1899.

(No Model.)

9 Sheets—Sheet 3.

Witnesses  
John H. Holt  
J. Stephen Giusta

Inventor  
H. A. Rowland,  
by Whitman & Wilkinson  
Attorneys.

No. 622,636. Patented Apr. 4, 1899.
H. A. ROWLAND.
SYSTEM OF MULTIPLEX TELEGRAPHY.
(Application filed Apr. 27, 1896.)
(No Model.) 9 Sheets—Sheet 4.
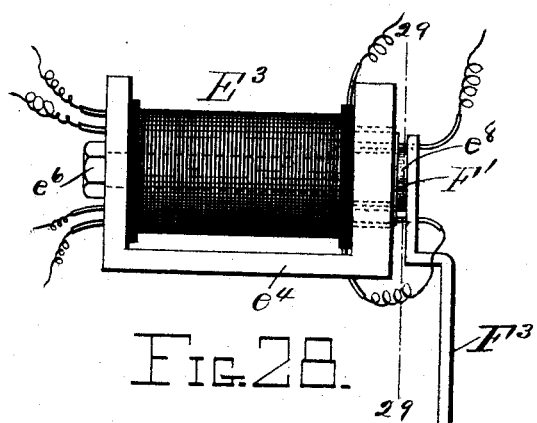
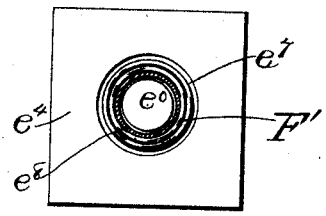
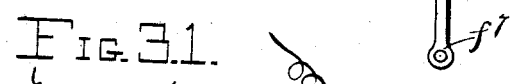
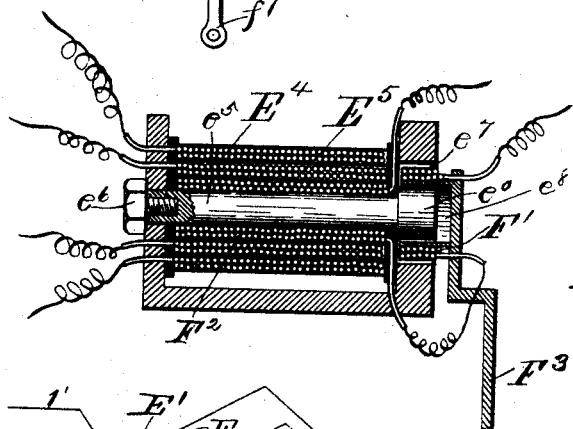
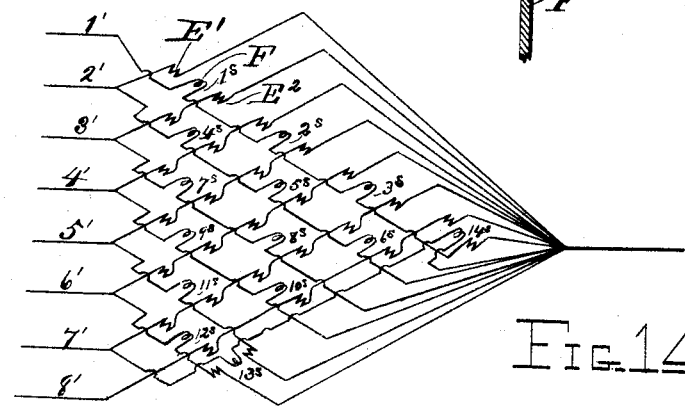

No. 622,636. Patented Apr. 4, 1899.
H. A. ROWLAND.
SYSTEM OF MULTIPLEX TELEGRAPHY.
(Application filed Apr. 27, 1896.)
(No Model.) 9 Sheets—Sheet 5.
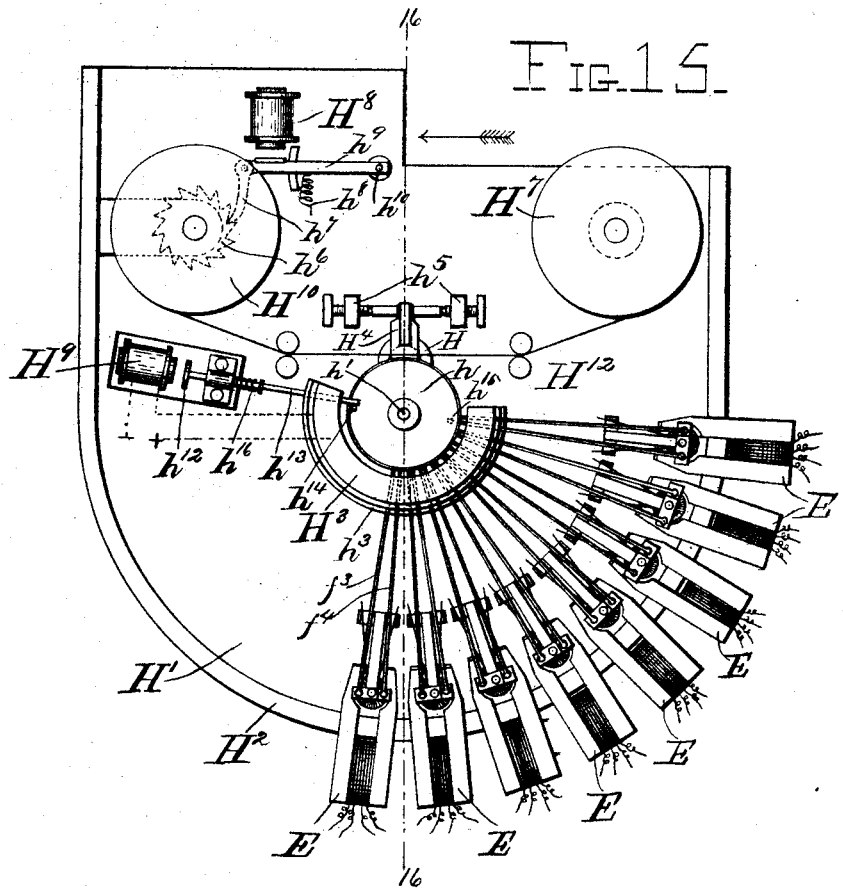
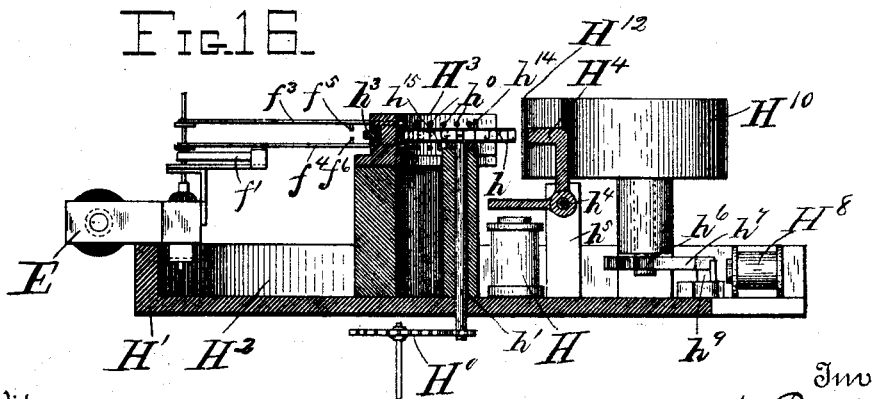
Witnesses
John H. Holt.
J. Stephen Ginsta.
Inventor
Henry A. Rowland,
by Whitman & Wilkinson
Attorneys.

No. 622,636.   
H. A. ROWLAND.  
SYSTEM OF MULTIPLEX TELEGRAPHY.  
(Application filed Apr. 27, 1896.)  
Patented Apr. 4, 1899.
(No Model.)  
9 Sheets—Sheet 6.
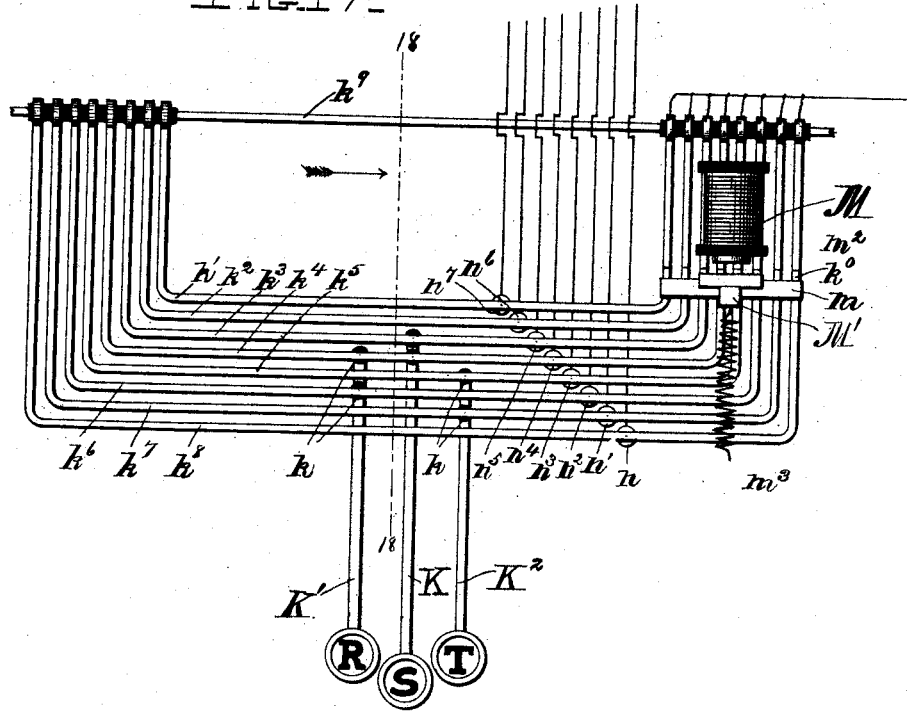
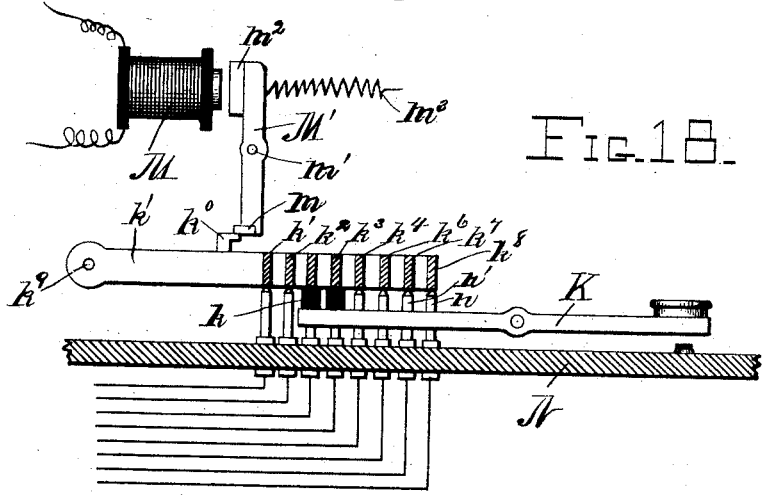

No. 622,636. Patented Apr. 4, 1899.
H. A. ROWLAND.
SYSTEM OF MULTIPLEX TELEGRAPHY.
(Application filed Apr. 27, 1896.)
(No Model.) 9 Sheets—Sheet 7.
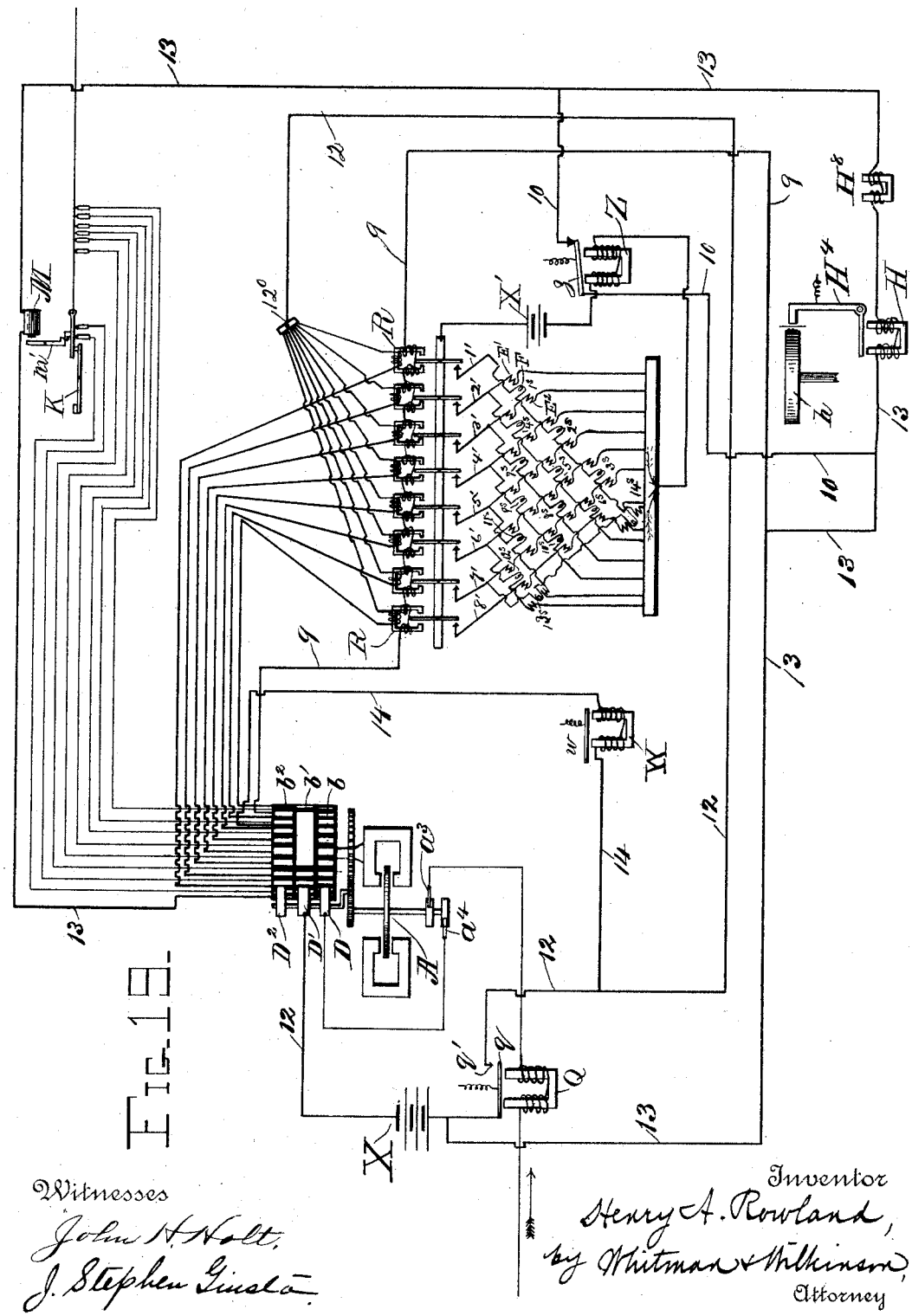
Witnesses
John H Holt,
J. Stephen Ginsla
Inventor
Henry A. Rowland,
by Whitman & Wilkinson,
Attorney

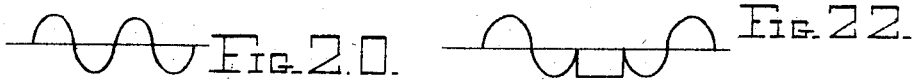
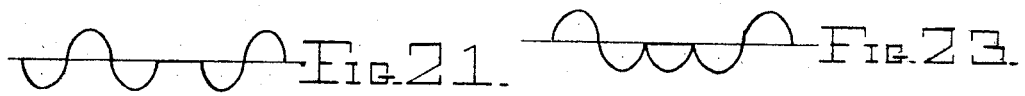
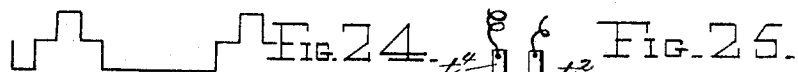
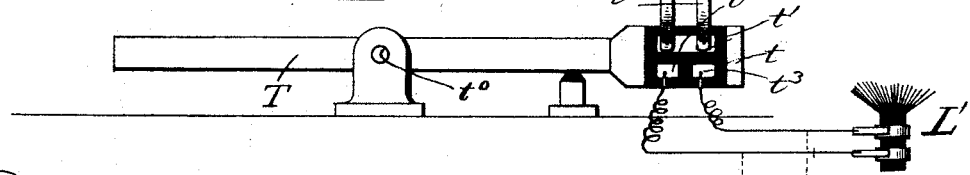
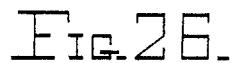
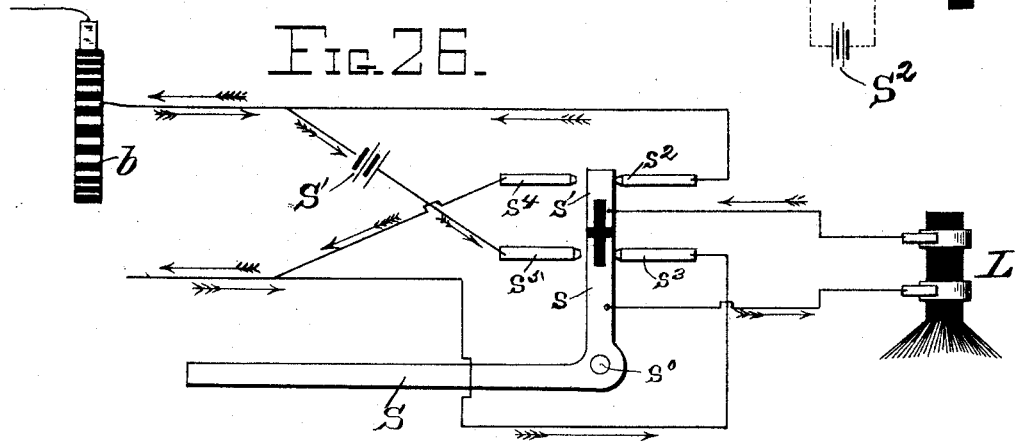
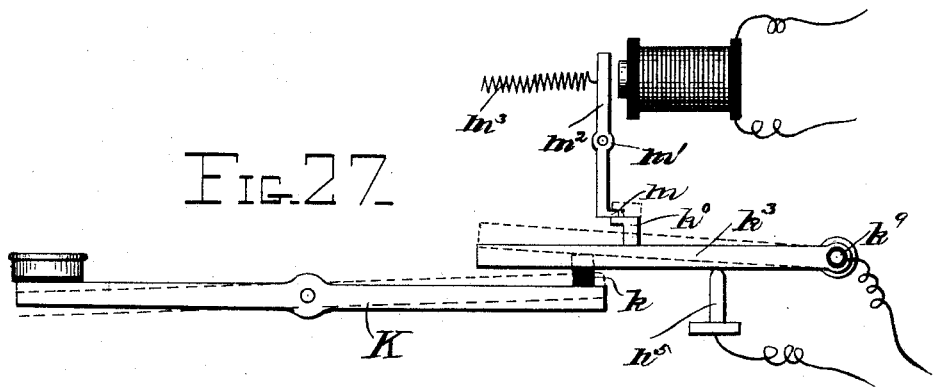

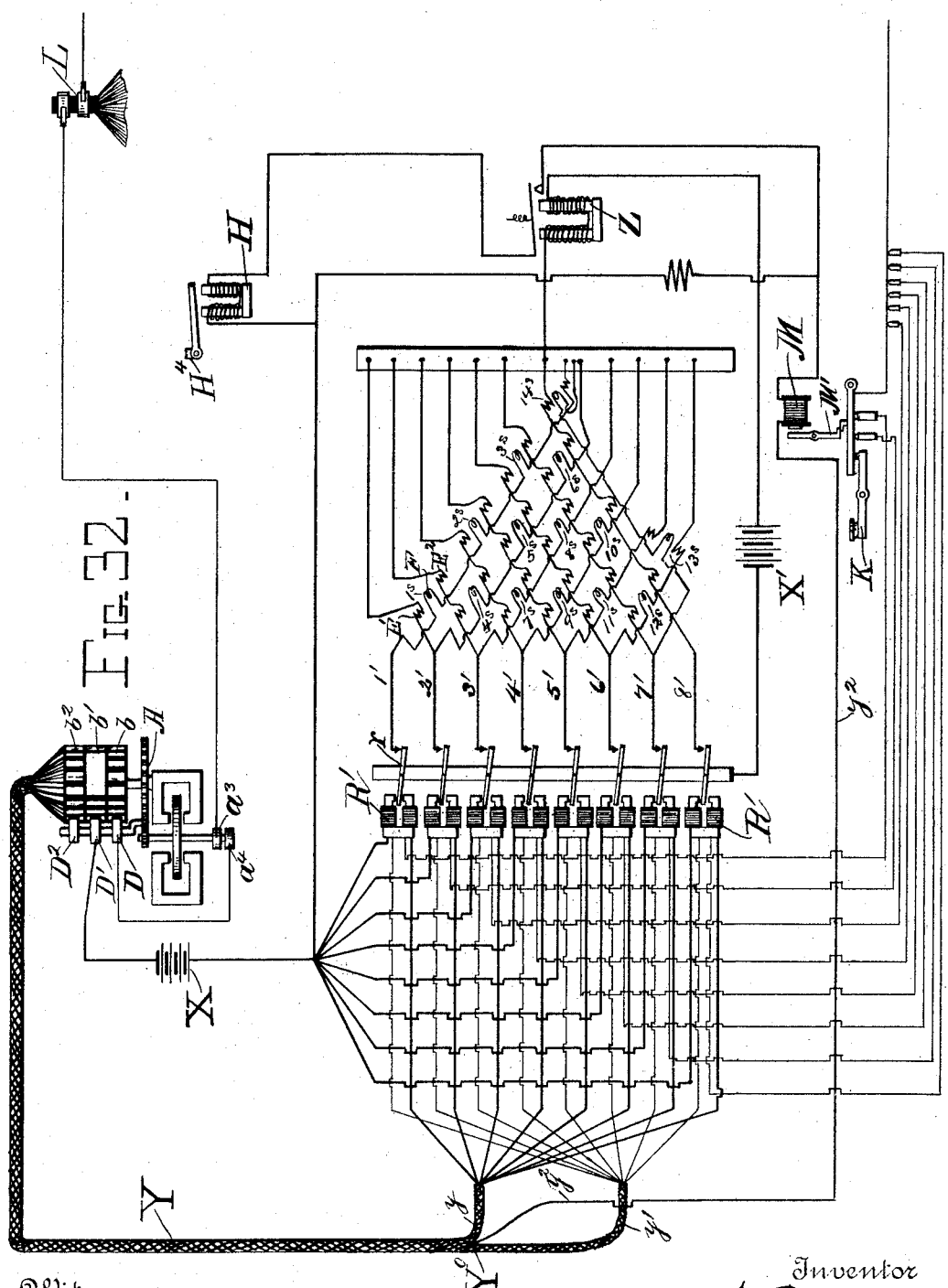

UNITED STATES PATENT OFFICE.

HENRY A. ROWLAND, OF BALTIMORE, MARYLAND.

SYSTEM OF MULTIPLEX TELEGRAPHY.

SPECIFICATION forming part of Letters Patent No. 622,636, dated April 4, 1899.

Application filed April 27, 1896. Serial No. 589,352. (No model.)

*To all whom it may concern:*

Be it known that I, HENRY A. ROWLAND, a citizen of the United States, residing at Baltimore city, State of Maryland, have invented certain new and useful Improvements in Systems of Multiplex Telegraphy; and I do hereby declare the following to be a full, clear, and exact description of the invention, such as will enable others skilled in the art to which it appertains to make and use the same.

My invention relates to improvements in systems of telegraphy in which an alternating current of electricity is used to transmit intelligence by so modifying the plus and minus waves thereof as to produce a system of signals; and the object of this invention is to produce a system of telegraphy by which messages may be transmitted and received in such a manner as will increase the efficiency of telegraph systems as well as reduce the expense of maintaining the same.

My invention further relates to that class of telegraph systems known as "multiplex," in which the multiplexing is obtained by the synchronous movement of certain current selecting and distributing devices. According to my invention these devices are so arranged as to divide the impulses of an alternating electric current into groups and to so separate these groups from each other that each may transmit a separate message.

My invention furthermore embodies an improved means of maintaining the synchronism between the current selecting or distributing devices, which consists, broadly, in driving the said apparatus by a motor the speed of which is regulated by a synchronizing device whose speed is governed by the alternating-signaling current.

My invention furthermore embodies a system of combining circuits, so that a comparatively small number of circuits may be combined to produce a large number of signals.

Furthermore, my invention embodies a means whereby these signals when received may be printed directly without the necessity of translation, though my system of transmission, as will be hereinafter shown, is not confined in its application to a printing-telegraph such as herein described, but is also applicable to other means for receiving the messages.

Finally, my said invention embodies various devices and forms of apparatus for putting such a system as above referred to into operation, and in order to more fully describe the same reference will be had to the accompanying drawings, in which the same parts are represented by the same letters and numerals throughout the several views.

Figure 6:
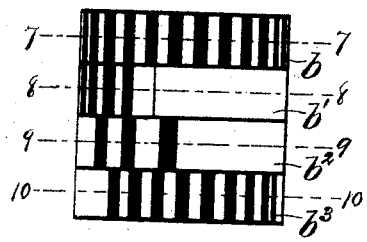
Figure 9:
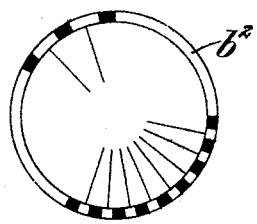
Figure 8:
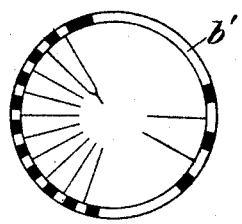
Figure 11:
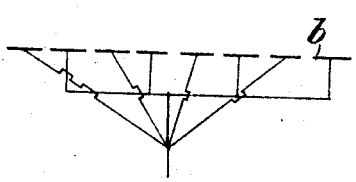
Figure 10:
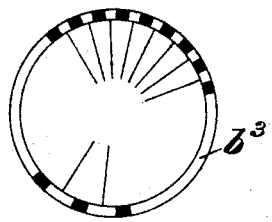
Figure 12:
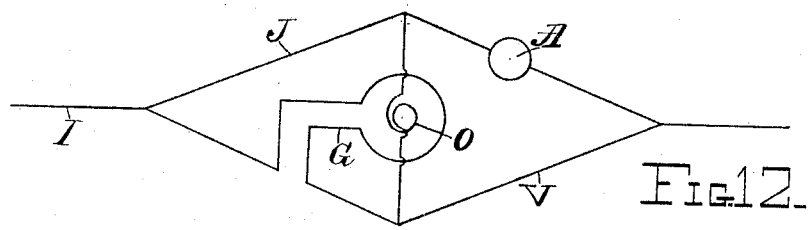
Figure 13:
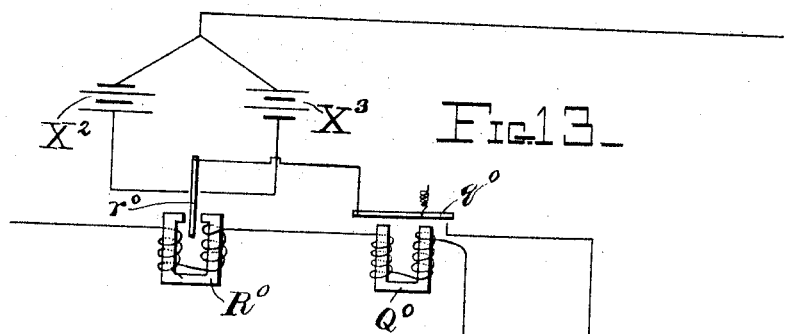

Figure 1 represents a diagram of both ends of a line and connections, parts being omitted for the sake of clearness in the drawings. Fig. 2 represents the synchronizing device with segmental cylinder and connections in side elevation. Fig. 3 is a plan view of the armature, showing the arrangement of the top coils. Fig. 4 represents a vertical section through the disk of the armature along the line 4 4 of Fig. 3. Fig. 5 represents a perspective view of one of the combination devices for setting the type. Fig. 5$^a$ represents a cross-section through the armature of the combination device shown in Fig. 5. Fig. 6 represents a segmental cylinder detached from the synchronizing device and adapted to operate three printers. Fig. 7 represents a sectional diagram taken along the line 7 7 of Fig. 6. Fig. 8 represents a sectional diagram taken along the line 8 8 of Fig. 6. Fig. 9 represents a sectional diagram taken along the line 9 9 of Fig. 6, and Fig. 10 represents a sectional diagram taken along the line 10 10 of Fig. 6. Fig. 11 is a diagram showing a method of connecting the segments in one of the commutators. Fig. 12 is a diagram showing connections for ascertaining whether the synchronous device at any station is in synchronism with the others. Fig. 13 is a diagram showing an ordinary relay connected in series with a polarized relay and the other connections for relaying the current. Fig. 14 is a diagram illustrating the method of making a small number of circuits reproduce a comparatively large number of signals. Fig. 15 represents a plan view of the printing mechanism with a number of the combination devices attached. Fig. 16 represents a vertical section taken along the line 16 16 of Fig. 15 and looking in the direction of the arrow. Fig. 17 represents a plan view of the keyboard, omitting, for the sake of clearness, all of the keys except three. Fig. 18 represents a vertical section along the line 18 18 of Fig. 17 and looking in the direction of the arrow. Fig. 19 is a diagram representing all of the instruments at a single station, with their electrical connections. Fig. 20 is a diagrammatic representation of the ordinary periodic wave-curve of an uninterrupted alternating current. Fig. 21 shows the wave in Fig. 20 modified by leaving out one of the plus waves. Fig. 22 shows the effect of reversing a wave with a continuous current by admitting electromotive force contrary to the direction of the wave and of a higher potential. Fig. 23 shows the effect of reversing the wave by means of an alternating current of higher electromotive force than the line-current and differing in phase from the latter by approximately one hundred and eighty degrees. Fig. 24 shows the effect of using an alternating current produced from a continuous current by means of a revolving commutator or other mechanical means for transforming a continuous current into an alternating one. Fig. 25 represents a key-lever and contacts for producing the modifications of the wave as shown in Figs. 22 and 23. Fig. 26 represents a key-lever, contacts, and diagram of circuits, showing how the alternating wave may be reversed and a battery-current superimposed. Fig. 27 shows a key and accompanying mechanism for simply cutting out one of the plus or minus waves, the effect of which is shown in Fig. 21. Fig. 28 represents in side elevation another form of combination device, showing in connection therewith a lever for operating the printing mechanism. Fig. 29 is a front elevation of the same device, partly in section, along the line 29 29 of Fig. 28 and looking to the left. Fig. 30 represents a vertical central section through the device shown in Fig. 28, showing the relative positions of the coils. Fig. 31 represents in diagram a device which may be substituted for the local polarized relays. Fig. 32 represents a diagram of the connections of a system differing somewhat from that shown in Fig. 19.

The basis of this system of telegraphy consists in employing an alternating current of electricity and modifying the plus or minus waves of the said alternating current as they pass a desired point and then in using this modification at the other end to transmit intelligence in many different ways.

The source of alternating current may be either an ordinary alternating-current dynamo, a transformer, or may be simply a revolving commutator or a vibrating commutator of any kind used to transform a continuous to an alternating current.

Throughout the specification and claims the term "wave" is used to mean ordinarily a single plus impulse or a single minus impulse. In some cases, however, the apparatus works equally well when the wave is defined as being both a plus and a minus impulse, and I mean to use the term in the following claims in the broadest or generic sense.

Where the alternating current is produced from a continuous one by means of a revolving commutator or other mechanical device for transforming a continuous into an alternating current, the sparking due to the sudden reversal of the current and irregularities introduced by imperfect contact, together with the departure of the waves from the sine form, all make them inferior to the alternating current with a sine-wave for keeping the exact control of the synchronous motors.

In order to more fully describe my said invention, reference will first be had to Fig. 1, which is a diagram simplified as much as possible to illustrate the principle of my invention. The dynamo or generator L represents the source of the alternating current, and $b\,b$ are two commutators or sunflowers having their segments connected to the main-line wire, as shown. The commutators or sunflowers $b\,b$ are each provided with brushes or trailers D, which travel over and in contact with the segments in synchronism with each other and with the generator L. These brushes are connected to the line, as shown.

Q is an ordinary or neutral relay connected in series with the main-line circuit.

$b'\,b'$ represent receiving sunflowers or commutators provided with trailers or brushes D', moving in synchronism with the generator or the alternating current and with each other. Although the segments of both commutators $b'\,b'$ may be connected to receiving apparatus, only that one on the right is shown so connected, as it will be assumed, for the sake of clearness and simplicity, that the apparatus on the left represents that at the sending end of the line, while that on the right that at the receiving end, though there may be intermediate stations also. In the segment-circuits of the commutator $b'$ are connected the local polarized relays R, a sufficient number of said relays being employed to receive a message, though only two are shown in the diagram to illustrate the principle of my invention.

In addition to the segments of the commutator $b'$, which operate separate local relays, there is provided an odd segment whose circuit traverses all of the local relays R, the object of which is to return their tongues to their initial position after they have been displaced by a signal. The segment-circuits of the commutator or sunflower $b'$ after passing through the relays R unite and are connected to the tongue $q$ of the line-relay, which tongue is kept in a state of vibration before the contact $q'$ by the alternating current. This upper contact $q'$ is connected to the circuit of the local battery X. The local-battery circuit then passes into the brush D'. The auxiliary windings $r$ of the relays connected to the odd segment of the commutator $b'$ are also connected in the local-battery circuit, as shown.

The operation is as follows: As shown in the diagram Fig. 1, the brushes D rest upon the segment of the sunflower or commutator connected to the segment-circuits 1. While the brushes are thus passing over those segments a current-wave from the generator will traverse the line in one direction, say, entering at the brush D at the sending end. Then as the brushes pass to the next segment another current-wave will be sent to line in an opposite direction, thus sending alternately a plus and a minus wave to line as the successive segments pass beneath the brushes 2 2. As long, then, as the line-circuit or segment-circuits remain unbroken through which the current is intended to pass, an unmodified alternating current will pass over the line and cause the tongue of the relay A to vibrate—that is, its tongue will be attracted for each present wave. As long, therefore, as the alternating current continues to flow uninterruptedly through the coils of the relay Q the local-battery circuit will be kept open, for if the armature of the line-relay makes contact with the local-battery circuit for each reversal of the line-current this will happen at such times as the insulation between the segments of the commutator $b'$ comes beneath the brush; but if at the moment that the brush reaches the segment connected to the wire 1 that segment-circuit had been broken this would cut out the wave which would have otherwise passed through the segment connected to that circuit. Thus it will be seen that it is the segments of the commutators or sunflowers that really cut out the waves and therefore measure or gage the amount of current to be modified, for although the branch circuit connected to one of the segments remains broken after the brush passes off of that segment it will not modify the line-current until the brush again reaches that segment.

Breaking the circuit connected to any particular segment renders that segment an insulator, as it were, and acting thus it cuts out the waves as described. The effect of this cutting out of the current will be to interrupt the current passing through the relay Q, so that it will cease to attract its armature for the time that the current through its coil is missing, in this case being the time of the length of a half-wave. Being thus released, the relay-tongue $q$ will complete the local-battery circuit until an unmodified line-wave arrives.

It will be seen that at the instant the local-battery circuit is completed the brush D' rests upon the segment of the commutator $d'$, which connects with one of the local relays R, and at that instant the tongue of the relay which is so connected will be actuated, thus producing a signal for the suppressed line-wave. The operation is the same for each succeeding relay. In actual practice a greater number of these polarized relays would be employed, obviously, so that the signals could be either read from them directly by noting the position of their tongues or they may be made to close certain circuits hereinafter shown and described in such manner that the signals transmitted may be printed.

The tongues of the relays are returned to their initial positions, as above referred to, by the auxiliary coils $r$, which are connected to an odd segment of the commutator, so that once in each revolution of the brush the local-battery circuit is completed through the said auxiliary coils.

Although in the diagram Fig. 1 I have shown only a limited number of segments—for example, only enough in the receiving-commutator $b'$ to operate seven relays—I do not confine myself to such a number. Indeed, if a small number were used eight would be preferable, as I will hereinafter show, as with such a number I may combine them in many different ways.

As the brush or trailer D passes over the sunflower it usually sends the positive impulses down one set of wires and the negative impulses down another set, so that the number of segments is generally even. However, I do not confine myself to such a disposition, as the case in which the number is uneven is useful in some cases. When the number of segments is uneven, each will carry alternately a positive and then a negative impulse. When even, the same set carries the positive impulses and the other set the negative impulses. In some methods of signaling, however, a whole wave containing both the positive and negative positions needs to be modified or cut out, so that I do not limit myself to having segments of any special breadth so long as they cover an aliquot number of half-waves. Furthermore, while I have described the brushes as "movable" and the sunflowers or commutators as "stationary," the brushes may be stationary and the commutators made to rotate. This, however, is an obvious alternative.

The synchronism of the movement of the brushes or commutators is maintained by the employment at each station, except in some cases the generating-station, of a small synchronizing device.

Properly speaking, this device is neither a dynamo nor a motor. Hence it will be called simply a "synchronizing device." This device (shown most clearly in Figs. 2, 3, and 4) consists, essentially, of a disk armature C, mounted between the poles of two permanent magnets A'. One magnet may, however, replace the two. This synchronizing device is driven by a continuous current or any other motive power and regulated by an alternating current. The armature consists of a non-magnetic disk C', preferably metallic, carrying upon its upper face three or more coils adapted to carry a continuous current and connected with a commutator $a'$, as described in my Patent No. 542,945, dated July 16, 1895, entitled "Improvements in electric meters." Upon the lower face of the aforesaid disk C' are mounted two coils for an alternating current and connected to the collector-rings $a^2$. These two coils can of course be replaced by four, six, &c., if desired. For the reception of the coils (both continuous and alternating) the disk C' may be provided with the cavities $c^2$ and $c^3$, as shown in the section Fig. 4, although I generally use flat disks without cavities. By using two coils for the alternating current the armature makes one revolution for each complete period of alternation. With four, six, &c., coils the speed will be reduced to one-half, one-third, &c.

The shaft $a$, carrying the armature, is journaled near its upper end in the arm $A^3$ and is supported near its lower end by means of a cone $a^5$, resting on a ball-bearing $a^6$, adjustably mounted, as by means of the screw $a^7$, in the base $A^2$. Usually three balls are used in this bearing.

Mounted on the shaft $a$ is a small gear-wheel $a^8$, which engages a larger gear $d^3$, and this gear is mounted on a hollow vertical shaft $d^4$, forming a sleeve, in which the stationary shaft $d'$ is journaled. The same shaft $d^4$ carries a disk $d$, which disk has mounted on its lower face and concentric with the central shaft two collector-rings $d^5$ $d^6$. At a point near the periphery of the aforesaid disk $d$ is mounted a brush-holder $d^7$, carrying three brushes insulated therefrom, the pair D' and $D^2$, for continuous current, being connected to the collector-ring $d^5$, and the single one D, for alternating current, connected to the ring $d^6$.

The slight viscous damping action caused by the non-magnetic metal disk moving in a magnetic field, as before alluded to, or the use of air or liquids for such damping purposes is especially desirable, inasmuch as it produces a steady motion and prevents oscillations. The absence of iron in the armature is also important, as hysteresis would damp the motion too much and would make the same irregular.

The coils carrying the continuous current, as before described, revolving between the magnetic poles and supplied with a proper commutator $a$, constitute a continuous-current motor, from which the power necessary to drive the synchronizing device may be derived.

An alternating current of low frequency is made to enter the armature through the brush $a^3$, then traversing the two coils $c'$ make its exit through the brush $a^4$. The object of this alternating current is for regulating the motion of the armature, and the source may be any of those hereinbefore mentioned. This current regulates all the synchronizing-machines on the line.

The continuous current to drive the motor may be as small as one-tenth of an ampere and ten volts, or even less, while the alternating current for regulation may be as small as one-hundredth of an ampere or from twenty to forty milliamperes. Thus the device is perfectly suitable to telegraphic needs, as only the ordinary strengths of current need be used. The action of the current in regulating this synchronizing device is somewhat the same as the action of the current on an alternating-current motor, except that in this case the armature is not driven by the synchronizing-current, but by an independent current, so that as long as the armature rotates in phase with the synchronizing alternating current no work will be done by that current; but if the armature should get out of step with the said synchronizing-current that current will then do work and either speed the armature up to the required speed or reduce its speed, as the case may be—that is, if it gets out of step—but the action of the alternating current is such as to prevent such vibration in its movement.

As a source of power other other than the continuous-current motor a little water-motor or clockwork, a falling weight, another continuous-current motor, or any other suitable source of power sufficient to drive the device may be connected to the armature-shaft.

B is a segmental cylinder capable of adjustment around the stationary shaft $d'$ and of being clamped to it in any position, so that by proper adjustment sparking may be prevented during the operation of cutting out the current. However, it is obvious that any simple means of shifting the cylinder around its axis may be employed. The apparatus for suppressing or cutting out the current is therefore designed to begin to cut out the waves or impulses at or in the region of minimum current, as it is well known that this is very nearly the region of minimum sparking. It is also well known that an alternating-current circuit cannot be cut without some sparking unless the angle of phase between the electromotive force and the current is zero. This cylinder B is shown as divided into three sets of segments, but the number of sets is dependent upon the number of printing devices operated by that synchronizing device. On each cylinder there is one set of segments for the alternating line-current and as many additional sets for local-battery circuits as there are printing devices to be opated.

A segmental cylinder detached from a synchronizing device is shown in Fig. 6. In this instance there are shown four sets of segments or separate commutators instead of three, as shown in Fig. 2. The commutator $b$ carries segments for the alternating current, while the commutators $b'$, $b^2$, and $b^3$ operate on local circuits. The commutator $b'$ has twelve segments—eight for the polarized relays, two for the sounder, one for operating the printing-magnet, and one for making the connection for bringing the relay-tongues back to their normal positions. The commutators $b^2$ and $b^3$ are similar to $b'$, except they are not provided with the two extra segments for operating the sounder, as only one sounder is necessary at each station. The two broad segments placed diametrically opposite from the group of narrow ones are for operating the printing-magnets and auxiliary coils on the polarized relays. Eight segments of the commutator $b$ may be replaced by sixteen, connected as shown in Fig. 11, in which every other segment is connected to the main line without passing to the keyboard or relays. By this arrangement only the main portions of the waves will be cut out.

The object of the plurality of commutators above described, as will hereinafter more fully appear, is to enable a number of independent operators to transmit and receive over the same line without interfering with each other.

The commutators $b'$ to $b^3$ and their brushes are often called "sunflower" and "trailer" devices, the latter term being well known in the art and used to designate usually a segmental ring provided with a brush or trailer which passes over and makes contact with the segments.

In order to tell when one synchronous device is not working in synchronism with the others, the arrangement shown in Fig. 12 is adopted. G and O represent the two coils of an electrodynamometer. A represents a synchronous device constituting a part of the circuit. Now as long as the resistances in the several arms of the bridge satisfy the equasion $AG=IO=JV$ the movable coil of the dynamometer will stand at zero when the device is in proper phase, but when the synchronizing device is not in proper phase with the alternating current arriving along the wire I the electrodynamometer is deflected. This equasion is the usual equasion of the Wheatstone bridge and expresses the fact that no current through O will be produced by an electromotive force in I and no current in G by an electromotive force in A. This is, of course, for a very slow alternating electromotive force only and needs correction for self-induction and capacity for a current of quick period. As the electromotive force at A produces no effect on the electrodynamometer and that in I none also, the electrodynamometer will only indicate the mutual action of the electromotive force in I on that in A. When these are in the same period and the phases are ninety degrees apart, the instrument stands at zero. With the period the same and phase different from ninety degrees the instrument indicates the work done by the electromotive force in I on the synchronous device at A. When the electromotive forces are not of equal period, the instrument indicates the beats of one current with respect to the other. When the coils of the electrodynamometer are mounted one on the diaphragm of a telephone and the others fixed, the ear can be used to determine the synchronism.

The office of the polarized relays R, before referred to, is to close and open eight, more or less, local selecting-circuits, and by doing this they actuate fourteen, more or less, "combination devices," which are so constructed as to work in conjunction with a printing mechanism and so connected as to render fourteen such devices capable of actuating a printing mechanism to print twenty-eight or even thirty-six or more characters.

The construction of the combination device is as follows: With other details it comprises two field-pieces $e$, Fig. 5, the winding on these fields being preferably for the present purpose composed of two coils $E'$ and $E^2$ wound in opposition to each other. The armature is simply wound with one coil F. The bracket of non-magnetic material $e'$ attached to the faces of the pole-pieces extends upward and is then bent at right angles when it engages the continuation of the armature-shaft $f$. Upon the top of this bracket is fixed an extension-arm $e^2$, which is provided at one end with the cross-head $e^3$. $f'f'$ are two arms of a spring rigidly attached to the shaft $f$ and bearing against the upwardly-turned ends $e^4$ of the cross-head $e^3$. The arms $f^2$, rigidly attached to the armature-shaft, are pivotally connected to the rods $f^3 f^4$. Now when a current is made to pass through one of the coils $E'$ and one through the coil of the armature F simultaneously the armature will tend to rotate in one direction, and likewise if a current be made to pass through $E^2$, which is wound in an opposite direction from $E'$, the armature will tend to revolve in an opposite direction; but in either case the revolution will be only through a small angle, due to the action of the springs $f'$. Suppose now a current to pass through the coil $E'$ and one through F. If this tends to make the armature revolve in the direction of the hands of a watch, by such partial rotation the rod $f^3$ will be driven forward, but immediately that the current ceases to flow in one of the coils of the device the armature is made to assume its normal position by the spring $f'$. When one of the rods $f^3$ or $f^4$ is driven forward, it fulfils a function in connection with the printing mechanism which will be described when that portion of the system is reached.

It is evident that no rotation of the armature will be produced by a current through the armature-coil F alone or through the coils $E'$ and $E^2$ alone, but only by a combination of a current through one of the coils $E'$ or $E^2$ with a current through the coil F.

The arrangement of circuits by which twenty-eight combinations can be gotten out of fourteen combination devices is shown by the diagram Fig. 14.

$1^s 2^s$ to $14^s$ represent combination devices in which the one-loop coils represent the coil F, and the coils on each side of the one-loop coils the coils $E'$ and $E^2$, respectively, of the working device.

It has been stated that a current through one of the coils would produce no effect; but the combination as explained above would in one case rotate the coil F to the right and in the other rotate it to the left. Now as we pass a current through one of the wires—say 3'—it will branch, going through the F coil of the combination devices $7^s$ $8^s$ and through the E' coil of combination devices $4^s$ and $E^2$ coil of $1^s$; but no effect is produced on any single device, as only one coil in each is traversed by a current; but now instead of taking the wire 3' alone we pass a current through both 3' and 4'. Then it will be seen that they both combine in device $7^s$, the current from 3' traversing the F coil and current from 4' passing though the E' coil. The same explanation applies to all fourteen devices. The practical result of this is that fourteen combination devices can be operated in a single local circuit having eight branch selecting-circuits, and as one combination rotates the coil F to the right and the other to the left it is obvious that twenty-eight simple movements can be gotten.

The printing mechanism as embraced in this invention will enable any one not possessing a previous knowledge of any system of signals to read the message as though it came from an ordinary type-writer.

It is obvious, as will be shown in describing the printing apparatus, that the use of the combinations two and two of the circuit does not obviate the use of the currents themselves singly, and thus the number of signals from eight currents may reach thirty-six.

The apparatus by which the altered waves produce printed characters is illustrated in Figs. 15 and 16.

The combination devices, which in the apparatus described are fourteen in number, are mounted around in a semicircle on the flange $II^2$ of the base II' of the printer. Only eight such devices are shown in position, as the other six are similar in every respect to those.

$II^3$ is a semicircular metallic collar provided with a double row of radial holes $h^0$, through which holes the ends of the rods $f^3$ and $f^4$ from the combination devices pass, as also the rod $h^{13}$. The type-wheel $h$, having the characters around its periphery, is provided with a shaft $h'$, to which is geared any suitable small motor $II^0$. $II^0$ may be clockwork, a falling weight, or any other device convenient for transmitting rotary motion to the type-wheel. It will be seen that one row of holes $h^0$ is just above and the other below the upper and lower faces, respectively, of the type-wheel. This arrangement allows one set of rods to pass above the type-wheel and the other below it.

Upon the upper and lower faces of the aforesaid type-wheel are two lugs or stops $h^{14}$ and $h^{15}$. The normal position of the stop $h^{14}$ is against the end of the rod $h^{13}$, so that when the rod is drawn out of engagement with the stop $h^{14}$ the type-wheel begins to revolve. $h^3$ is a small metallic band passing around the collar $II^3$ and insulated therefrom. Suppose the currents pass through one of the combination devices in such a way as to cause the armature to turn to the right, as before explained. When this happens, the rod $f^3$ is driven forward, which causes the lug $f^5$ thereon to come in contact with the metal band $h^3$ and at the same time causes the end of the rod $f^3$ to extend over the face of the type-wheel. When contact is made between the collar $II^3$ and the band $h^3$, an electric circuit is completed through the electromagnet $II^9$, which attracts its armature, thereby pulling back the rod $h^{13}$, against which the lug $h^{14}$ was pressing, and thus allowing the type-wheel to rotate. The type-wheel having been set in motion will continue to rotate until the stop $h^{14}$ strikes the end of the rod $f^3$ which is now projecting over the type-wheel. By this operation a letter on the periphery of the type-wheel will be set in position in front of the printing-hammer $II^4$. This hammer is pivotally mounted in a stand $h^5$ and actuated by the electromagnet II. The magnet II is included in the local-battery circuit and connected with a segment of one of the commutators on the synchronous machine, so that once in every revolution of the brush D', provided a signal is sent, the odd segment completes the circuit through the magnet II and causes it to attract its armature, thereby forcing the head of the printing-hammer against the letter on the type-wheel directly in front of the hammer. A strip of paper $II^{12}$ is inserted between the hammer $II^4$ and the type-wheel. This strip of paper $II^{12}$ is wound on a roll $II^7$. As the printing process continues, the paper advances (to the left in the figure) one space for every letter printed. The way in which this is accomplished is as follows:

$II^{10}$ is a receiving-reel, with its shaft extending downward, and at the lower end of this shaft is mounted a ratchet-wheel $h^6$. In engagement with this ratchet is the pawl $h^7$, which pawl is pivotally mounted on an arm $h^9$, which is pivoted at $h^{10}$. The electromagnet $II^8$ is placed in front of the arm $h^9$ and the spring $h^8$ holds the said arm away from the magnet. The paper strip from the roll $II^7$ is attached to the roll $II^{10}$. The electromagnet $II^8$ and the magnet II are connected in series or in parallel, so that whenever a letter is printed the magnet $II^8$ is excited, as well as II, which causes the former to attract the arm $h^9$, causing the pawl to become engaged with the tooth in the rear of the one previously engaged, and when the magnet $II^8$ ceases to be magnetized the arm $h^9$, actuated by the spring $h^8$, returns to its initial position, advancing the ratchet-wheel the distance of one tooth, which amounts to the advancement of the paper $II^{12}$ one space to the left in front of the printing-hammer. When the rod $f^3$, which had stopped the type-wheel in its motion is withdrawn, which will happen when the letter is printed, then the wheel continues on its revolutions until the lug $h^{14}$ engages the rod $h^{13}$, where the type-wheel stops and there remains until another combination device is actuated or until the other rod of the same device is operated.

It is thus seen that by using fourteen combination devices I am enabled to get twenty-eight simple movements, by which twenty-eight characters may be printed, and it is further obvious that the number of characters could be increased to any extent by increasing the number of combination devices.

For every eight segments on the segmental cylinder I can work one printer, so that the number of printers is limited by the number of segments on the commutator. With an alternating current of sixty periods per second I can transmit two multiplied by sixty multiplied by sixty divided by eight, equaling nine hundred letters per minute on one printer or work nine printers with one hundred letters each per minute.

So far I have had reference, with a few exceptions, particularly to the receiving devices. The signals are sent, or, in other words, the waves are modified, by causing certain segments of the commutators or segmental rings $b$ to suppress these waves, generally suppressing two waves for each letter. The segments are thus made to suppress the said waves by having the electric circuit through them broken when they pass beneath the brush. These circuits are broken by means of the keyboard shown in Figs. 17 and 18.

It has been previously shown that to operate the combination device, which is required in the printing of a letter, the combination of two currents in the same device is required, and this combination is gotten by actuating two polarized relays, which require for their proper actuation that two waves be modified in the line-current for each signal or character to be transmitted. The keyboard for the accomplishment of this end is nearly the same for all methods of modifying the waves. I will show the one for altering or modifying the current by leaving out a plus or minus wave. This keyboard is so made that the keys cannot be depressed when they would interfere with the working of the other apparatus.

Referring to Figs. 17 and 18, K, K', and K² are three keys representing as many letters of the alphabet, and $k'$ and $k^2$ to $k^8$ are eight pivoted conductor-bows mounted on the rod $k^9$. Obviously a common return-wire would be connected to the bows. Each key carries on its upper face one, two, or more knobs $k$, preferably of insulating material and two in number. Two knobs on each key are placed directly under two bows. Thus by depressing the key K two bows are raised, and by depressing K² two other bows are raised, and so on, so that by using eight levers or bows and combining them two and two I can get twenty-eight combinations. There are eight contact-points $n$ $n'$ $n^2$ to $n^7$, in contact with which the eight bows are normally held, thus completing an electric circuit through each of the bows and the wires leading from the contact-points, as shown in Figs. 17 and 18. On top of each bow is a stop-lug $k^0$, having a projecting lip, which stops are placed in a row across the keys parallel to each other. Just above the stops $k^0$ is a bar $m$, attached to a lever M', which is pivoted at $m'$, and on the upper end of this lever is an armature $m^2$.

M is an electromagnet.

In order to send one letter, preferably two circuits must be broken, thereby breaking the connection with two segments of the commutator of the transmitter, which will suppress or cut out two waves of the current. The operation of the keyboard to accomplish this is as follows: Suppose we wish to transmit the letter "S." The key K, with that character on it, is depressed. This raises two of the bows $k^3$ and $k^4$, thereby breaking the contact at the points $n^4$ and $n^5$. As the bar $m$ holds down the bows and keys by being placed just above the lugs $k^0$, it is evident that no key can be depressed until this bar be removed. The operator places his finger upon the key K, and when the electromagnet M is magnetized the armature $m^2$ is drawn quickly to it, when the bar $m$ is thrown back, allowing the lug $k^0$ to rise; but as the action of the magnet is only momentary the bar $m$ quickly assumes its former position; but by this time the lug $k^0$ has risen so that the bar $m$ engages the under side of the lip thereof, and hence it is that the bow is held up until the magnet is again magnetized, when the lip is released and it returns to its former position, closing the circuit. When the operator feels a key give way under his finger, he quickly finds the next letter to be transmitted and presses that key; but it will under no circumstances operate until the magnet controlling it acts.

Having taken up the several instruments used in this system for transmitting and receiving messages and explained their functions separately, I shall now refer to Fig. 19, which shows the electrical connections between all of the instruments at one station, and under this head will explain the complete process of sending and receiving a signal.

In the diagram Fig. 19 the light lines represent the main-line circuits and the heavy lines the local-battery circuits. It will first be assumed that no signal or message is being sent to the station, Fig. 19. In this event the line-current will pass uninterruptedly through the line-relay Q, causing it to attract its armature in unison with the current, as explained in connection with Fig. 1. The line-wave then passes into the synchronizing device A, if coming from the left in the drawings, then through the brush $a^3$ and out at $a^4$. Then after passing out of the synchronizing device the wave enters the brush D and passes into one of the eight line branch circuits, (indicated at the top of the figure,) according to which one is in contact with the brush D at that moment. The line-wave then passes through the keyboard and into the main-line wire again. The above is the course of the main-line current, which is the same whether a signal is sent or not; but no signal is supposed to have been sent as yet.

The following is what takes place in the local circuits when the signal is not being sent or received: The current from the local battery X cannot pass through the armature $q$, as that circuit is broken by the attraction of the armature by the relay Q; but the local current at one position of the brush D' can pass around the circuit 13, where most of it is shunted around through the circuit 10, traversing the armature $z$ of the magnet Z, but not actuating the printer-magnet H. It then enters the main local circuit 13 again, and traversing the magnet M on the keyboard returns to a segment in the commutator $b'$, and when that segment comes in contact with the brush D', which is once in every revolution of that brush, the current passes on into the battery, completing the circuit. Now if a signal is sent the condition is altered and is as follows: The line-current enters the coil of the relay Q with one of its waves cut out or missing. These line-waves then take the same course as explained above; but owing to the fact that there is a missing wave in the current passing through the relay Q the armature $q$ thereof will be momentarily released and, actuated by the spring above it, will partially complete the circuit 12 from the local battery. The local-battery current then traverses the circuit 12, since the armature $q$ partially completes that circuit. Following the circuit 12 around it is seen that when it gets to $12^0$ it divides into eight branch circuits, each one of which passes around one of the windings of one of the polarized relays R. From the relays the wires lead to eight corresponding segments in the commutator $b'$, and that relay will be operated to which the segment of the commutator is connected which happens to be under the brush D' at that particular instant—that is, at the time a signal is received. Thus if two modified waves pass the relay Q, which are generally used to transmit a letter, then two of the polarized relays R will be actuated. The current from the crcuit 12, passing through one of the relays R, causes the tongue of that relay to be attracted to the right in the figure, by which one of the eight circuits $1'$ $2'$ to $8'$ is closed. These local selecting-circuits $1'$ to $8'$ are shown as operated by a separate battery X' for the sake of clearness, though all of the circuits may be operated by the single battery X. It was shown in the description of the combination devices that closing two of these circuits $1'$ to $8'$ would operate one of those devices; but in addition to operating the combination devices this local selecting-circuit fulfils another function. Immediately that the local selecting-circuit becomes complete the electromagnet Z becomes magnetized, which by attracting its armature $z$ breaks the shunt-circuit 10, allowing the current in circuit 13 to pass through the magnet H, thereby operating the printer. This circuit 13 is not entirely complete, though, until the segment of the commutator $b'$, which is connected to the circuit 13, comes in contact with the brush D'. After the segment in the commutator which is connected with the circuit 13 passes from under the brush D' another segment comes beneath that brush. This latter segment is connected to the circuit 9, which passes in series around each of the polarized relays R and in opposition to the regular winding thereof, so that when after the letter has been printed and after the brush D' completes the circuit 9 the tongues of those relays R which have been displaced are brought back to their initial positions.

A simple way of determining whether the commutator or sunflower at any particular receiving-station is properly set to receive the message from another station is as follows: One of the receiving-commutators at each station is provided with an odd segment or segments, as shown and described in connection with Fig. 8. Then if a wave is left out of the line-current at the same point in each revolution of the synchronizing device and the receiving-commutator is properly set the sounder W in the circuit 14 will make a click each time the odd segment of the receiving commutator comes beneath its brush.

The above is the entire process of receiving a signal. That of sending one consists simply in breaking the line-circuit by depressing one of the keys, as K, which breaks two circuits connected to two segments of this ring or commutator $b$, which cuts out two waves at every pressure of the key, thereby transmitting one letter, which is printed at the other end or any other station; but, as hereinbefore stated, a number of printers may be operated from the cylinder B, depending, of course, upon the size or number of local commutators composing it.

The way in which the system is multiplexed is as follows: Suppose instead of having simply one set of segments, as those composing the commutator $b'$, connected to the eight local wires, Fig. 19, we have another commutator $b^2$, composing a part of the cylinder B and displaced around the axis thereof relative to the commutator $b'$, as shown most clearly in Figs. 8 and 9, and each of these eight segments connected to a set of eight local wires, as was done with the segments of the commutator $b'$, and let these local wires be connected to local receiving apparatus similar to the others. Then it is perfectly obvious that all modified waves which arrive at the relay Q while the segments of commutator $b'$ are passing under the brush D' will be recorded on the printer or receiver connected to those segments, and similarly all modified waves arriving at the relay Q when the segments of the commutator $b^2$ are passing under the brush D² will be recorded upon the receiver or printer connected with those segments. This is perfectly obvious, for the segments of the commutator b' do not pass in contact with the brush D' at the same time that the segments of the commutator b² pass in contact with the brush D², being mounted on separate rings and displaced around the axis, as shown most clearly in Figs. 6 to 10, inclusive. Likewise any number of printers may be operated by one synchronizing machine, depending only upon the number of separate groups of segments or separate local commutators.

A single commutator or segmental ring, such as b, will suffice for all of the sending-segments; but these segments must be sufficient in number to be divided into as many groups as there are separate printers to be operated or separate messages to be received, as shown in Fig. 7. By operating upon any particular group of segments in the sending-commutator the message will be received upon that group of the receiving-commutators at the other station which corresponds to that group in its position relative to the sunflower trailers or brushes. As the diagram Fig. 19 represents both sending and receiving apparatus, it is not necessary to show another station, which would be merely a repetition of that already shown.

In order to relay an alternating current correctly which has a wave left out here and there, or, in other words, to produce a relayed alternating current which shall be a correct reproduction of the primary current having a wave or waves left out or otherwise modified here and there, it is necessary to use two relays, one a polarized relay and the other an ordinary relay, the two being connected in series. This method of relaying is shown in Fig. 13.

The alternating current to be relayed passes through the coil of the polarized relay $R^0$ and then through the coil of the ordinary relay Q. The new or relayed current passes through the batteries $X^2$ and $X^3$ and the armatures $r^0$ and $q^0$ of the relays. The polarized relay changes the polarity of the relayed current, and the ordinary relay makes the circuit for each wave, and thus by this arrangement the same form of curve representing the main-line current will represent the relay-current. This is obvious for the reason that if the polarized relay alone was used its tongue would remain where attracted until a wave of opposite polarity from the one which last acted upon it arrives. Thus a missing wave would not be cut out of the relayed current; but two waves of the same sign would be repeated. The relay $Q^0$ will, however, cut out the current, and therefore produce a relayed current similar to the primary or line current.

As the above-described system is a closed-circuit system, the signals being made by breaks in the current, it is evident that the signals can be given from either end or from any of a series of stations on the same wire without a local battery. Thus a break at one station signals back and forward to any other portion of the circuit.

As the synchronizing devices employed in this system of telegraphy are very small, the sum of the counter electromotive forces generated by all of them on a circuit is correspondingly very small. Otherwise a troublesome vibration in the devices and dynamo may be set up.

While I have described above a system of printing-telegraphy, it is evident that I may increase the number of polarized relays and have one make a signal for each of the twenty-six letters of the alphabet and any other signals that may be required, as for spaces or changing the line of a page-printer. Likewise a system like that of the Morse system might be constructed with one, two, three, or more relays. Thus where one relay is used the segments may be read from it as from a sounder, as the cessations due to the missing waves are so distinct that they may be readily received by ear, or if, as stated above, a large number of polarized relays, such as R, are used the signals may be read from them directly by the eye from the position of their tongues.

As the number of relays may be varied indefinitely in the system described, I have generally used the combination of the currents two and two for designating or printing the letters, as this is the most simple system; but one can at the same time use the single circuits, as well as their combinations.

It is evident that any number of printing instruments can be operated over the same line at once and independently. Likewise any number can be used in a modified Morse system. When the signals are received upon a relayed circuit, one system of two relays on the line, as in Fig. 13, will do for all the signals—that is to say, two relays at any given station, arranged as shown in Fig. 13, will receive all of the messages sent to them, whether from separate persons or not, or one repeater, similar to the Wheatstone automatic, may be substituted for the relays shown in Fig. 13 and will do for all the separate persons sending signals. Indeed, the Wheatstone automatic receiver is especially well adapted to use with my system. The system may also be applied to ringing signal-bells at any number of separate stations. Again, automatic connections to any other line or between lines can be made. The method is indeed so general that it can be applied in a great many different ways.

Instead of the type-wheel in the printing device a pointer can be used to point out various devices on a dial.

The method shown in Figs. 1 and 19 is susceptible of a slight modification by causing the relay Q when excited to make the circuits through the polarized relays R instead of breaking it. The action in this case is to operate the polarized relays R, so as to break the local circuits to the combination devices before all the waves, while it leaves them closed for all waves wanting. The local circuit through $b'$ in this case always operates to close the local circuit of the relays R in their initial condition, and they are then left closed for all waves that are wanting until the printing is accomplished. For convenience the circuits to the combination devices are broken until the polarized relays are set for the given letter while they are made until the printing is accomplished.

While the system just described is based on the modification of an alternating current by cutting out an aliquot number of wave impulses of equal length or at equal intervals and the actuation thereby of an ordinary relay placed in the main-line circuit, this system is capable of many modifications. For instance, the alternating-current waves may be modified in other ways than by simply leaving out a plus or minus wave, and by passing both line-current with its modified wave and a local current through suitable polarized relays these different modifications of the current-waves are made to accomplish the same result as is obtained by the foregoing system. The synchronizing devices remain the same in both systems; but the combination devices, polarized relays for actuating the said combination devices, printing mechanism, and keys for producing the different modifications of the waves may differ from those hereinbefore described, although involving the same principle. The method of leaving out a plus and minus wave of the alternating current is applicable to both systems. Some of the ways of accomplishing these modifications of the alternating-current waves are as follows:

In Fig. 26 is shown a method by which one of the plus or minus waves is reversed and a battery-current superimposed. The lever S, pivoted at $s^9$, has the upper portion $s'$ of its upwardly-extending arm insulated from the lower portion S thereof. The wave coming from the alternator L enters the portion $s'$ of the lever, then passes into the contact-piece $s^2$, and from thence around the circuit through the commutator or sunflower $b$. Coming back it passes through the contact-piece $s^3$ into the portion S of the lever and back to the alternator. Press the lever S and the circuit is then changed. The wave from alternator entering at $s'$ passes into contact $s^4$, crosses in the direction of the arrow, goes around the circuit in a direction opposite from that in which it goes if the lever is not depressed, and returns through the battery S', through the contact $s^5$ into the lever, and thence back to the alternator. A graphical representation of this effect is shown in Fig. 22. This can be used to the most advantage at the dynamo end of the line.

While only one of the contact-levers is shown in Fig. 26, the circuit connections for the other levers will be obvious, the connections to the contacts and commutater-segments being arranged in parallel.

In Fig. 25 is shown an arrangement for introducing an alternating current differing in phase by one hundred and eighty degrees from the line-current. The lever T carries upon one of its ends a plate of insulating material $t$, and on the face of this plate are three contact-pieces $t'$, $t^2$, and $t^3$. The brushes $t^4$, carrying the line-current, normally rests on the piece $t'$, completing the circuit. Now when the lever is depressed the end carrying the contact-pieces is raised and the brushes come in contact with the pieces $t^2$ and $t^3$, introducing the alternator L'. The effect of this is graphically shown in Fig. 23. By introducing a battery-current of high electromotive force, as shown at $S^2$, instead of the alternating current a wave like that of Fig. 22 will be the result. One of the wires from the brushes $t^4$ passes to a commutator, such as shown in Fig. 26. I have shown a single key-circuit and contact-screw in Fig. 27 for producing the effect shown in Fig. 21—that is, by leaving out a plus or minus wave. The contact between $n^5$ and $k^3$, being momentarily broken, produces that effect.

A modified form of combination device is shown in Fig. 28 having two fixed and one movable coil, as before. The combination device $E^3$ is supported in a metallic frame $e^4$, and a central magnet-core $e^5$ is fitted into the said frame $e^4$ and secured by a screw $e^6$. One end of the frame is provided with an annular opening $e^7$, into which projects the head $e^9$ of the core $e^5$. Now on this core there are three separate windings, the two outside ones $E^4$ and $E^5$ connected separately to two of the local circuits and the third, $F^2$, next to the magnet and connected in series with the coil F', this coil F' being mounted on a small cylinder $e^8$, carried by the lever-arm $F^3$, pivoted at $F^7$. The cylinder carrying the coil F', it will be seen, surrounds the head $e^9$ of the magnet-core.

The operation of the device is as follows: A current through either $E^4$ or $E^5$ alone will not attract the coil F'; but simultaneous currents through $E^4$ and F' or $E^5$ and F' will cause attraction or repulsion between the two, dependent upon the direction of current sent through $E^4$ or $E^5$. A current through F' only will, however, cause the coil to move inward. To check this action, an extra coil $F^2$ is wound on the core and, being in series with the coil F', exercises a repulsive effect on that coil and so causes equilibrium, unless a current is sent through $E^4$ or $E^5$ also. Hence the final arrangement gives an instrument neutral to a current through the coil F' or the coil $E^4$ and $E^5$, but operated by the combination of a current through the coil F' and one through either of the coils $E^4$ or $E^5$. According as the currents passing through the coils F' and $E^4$ or F' and $E^5$ are both plus or both minus or one minus and the other plus the coil F' will move over or away from the core; but by the double winding on the core $e^5$ two plus currents can take the place of a plus or a minus current, as the second plus current can be sent through in the opposite direction to the first. It is readily seen that this combination device is the same in principle as the one first described. It will be obvious that when the coil F' is thus attracted or repelled the lever-arm $F^3$ upon which the coil F' is mounted will be made to move in or out. This lever-arm may be employed to operate a portion of the printing mechanism, as do the arms of the combination devices shown in Fig. 5.

The seven, eight, nine, or more polarized relays are used only for convenience, as it is evident that the same thing can be accomplished in many different ways. All that is necessary is to make an arrangement which can be operated by the electric current, so as to keep a number of circuits leading to the printer closed until the printing is accomplished. Thus a device, as shown in Fig. 31, can be used instead of the local relays shown in Fig. 19, where the local circuits would be closed by the magnet $R^2$ and opened by $R^3$. In this case there would be as many magnets $R^3$ as relays and each operated upon its selecting-circuit; but $R^2$ may be one long magnet acting on all of the tongues and upon an independent circuit, which is completed periodically, or there may be a plurality of such magnets and all connected in series. Indeed, it is evident that one of the sets $R^2$ or $R^3$ can be consolidated, so that all eight or nine circuits can be brought back to their initial position together by one magnet.

The combination devices for the modified system having been described separately, the synchronizing device and keyboard being the same for both systems, the diagram Fig. 32 will now be taken up, which includes the connections and instruments for one complete station of the modified system. In this figure the heavy lines represent local or battery circuits and the light lines the alternating or line circuits. The alternating-line current from the alternator L entering the brush $a^3$ of the synchronizing device A passes through the armature thereof and out at the brush $a^4$. From there the current enters the brush D and passes into a segment of the commutator $b$ under that brush. Now the plus and minus waves are separated out and made to pass through, say, eight wires from the corresponding eight segments of the commutator $b$. These eight wires enter a cable Y and branch at $Y^0$ into a smaller cable $y'$, and from the end of that cable they branch out, going to the eight relays, and from thence they pass to the line-wire again. Now a local current from battery X enters the segmental cylinder B through the brush D'. The current passing through the brush D' enters the segments of the commutator $b'$. From these segments in the commutator $b'$ pass wires into the cable Y and branching at $Y^0$ pass through the cable $y$, then branch out, going through separate coils on the eight relays corresponding to those traversed by the alternating currents just before described. Passing through the eight relays these currents again unite and return to the battery X. In addition to the coils on the relays R' for carrying the local current each relay has a coil for the alternating current, so that the relays are simultaneously acted upon by two currents, one the given impulse of the alternating current and the other a local current which partly neutralizes the effect of the other. It is obvious, then, that when an alternating-current impulse is cut out the local current acts to move the armature of the relay. The light lines represent the alternating-current wires going to the relays R' and the heavier lines the local battery wires going to the same instruments. Now if two modified line-waves reach the brush $a^3$ they will pass through the segments of the sunflower under that brush around through the cable Y into the relays R', according to which relays of that group happen to correspond with the segments at that movement under the brush $a^3$, the effect upon the relays so traversed by the line-waves being to move their armatures as above described. The armatures $r$ constitute a portion of a local curcuit which operates the combination devices. The circuits through the relay-armatures and combination devices are normally open. When the relay is acted upon by the presence of a modified wave in one of its coils, it at once closes one of these circuits. As we are assuming the two top relays to be the ones acted upon, the circuits 1' and 2' will be closed, operating the corresponding combination device, but a letter cannot be printed until the magnet H operates. We have thus far traced sixteen wires from the cylinder B—eight line alternating currents and eight local currents. The commutator $b'$ has a segment connected to a wire $y^2$, which branches from the cable Y at $Y^0$ and passes through the electromagnet M, then joins the local circuit, and enters the battery X. When the circuit through the battery X' is closed by the relays, the magnet Z attracts its armature, partially completing the circuit $y^2$ from the odd segment just described; but when the segment connected to the wire $y^2$ comes under the central brush D' the circuit is then completed, and the electromagnet $H^{15}$, connected in multiple with this circuit, is made active and operates a printer. In this way twenty-eight signals may be received and printed, twenty-six of which may be letters of the alphabet and the other two may be punctuation-marks, spaces, or the like, or any desired symbols may be adopted. If nine or ten circuits are used in the combination devices, then we have enough signals to use for the twenty-six letters of the alphabet, the ten numerals, &c., and some can be used for changing the type-wheel for spaces and for changing the printer to a new line.

Suppose now it is required to send a signal to some other station, which will be generally similar to the station just described. The operator places his finger upon the key K, and when the odd segment before referred to comes in contact with the central brush D', the electromagnet Z having previously acted and partially closed the circuit, the current through the electromagnet M of the keyboard acts, causing that magnet to attract its armature, and the operator feels the key give way under his finger, and by this two circuits are broken, thereby altering two waves, which pass to the next station and are received, as explained. The same principle applies to sending a message either from the dynamo end or from any other part of the line for the method of leaving out a wave. The method of reversing a wave is best practiced from the dynamo end.

It will be obvious that the alternating-current dynamo running, as it does, in synchronism with the synchronizing devices can be used to replace one of the latter.

I claim, broadly, as my invention—

1. The method of transmitting intelligence, which consists in dividing the waves of an alternating electric current into groups, modifying one or more of such groups by suppressing one or more waves therein and transmitting the modified current over a line, substantially as described.

2. The method of transmitting intelligence, which consists in dividing the waves of an alternating electric current into groups, modifying one or more of such groups by suppressing a plurality of waves therein and transmitting the modified current over a line, substantially as described.

3. The method of transmitting intelligence which consists in dividing the waves of an alternating electric current into groups, modifying one or more of such groups by suppressing two waves in each group to represent a character and transmitting the modified current over a line, substantially as described.

4. The method of transmitting intelligence by an alternating current of electricity having waves of equal length which consists in modifying the waves of the said current by reversing one or more of said waves and superimposing thereon a wave of different character, substantially as described.

5. The method of transmitting intelligence by an alternating current of electricity having waves of equal length which consists in modifying the waves of the said current by reversing one or more of said waves and superimposing thereon a wave of differing character, transmitting the modified waves to a distant point, and then operating a signaling device by means of the modified waves, substantially as described.

6. The method of transmitting intelligence which consists in dividing the waves of an alternating electric current into groups, modifying one or more of such groups by suppressing a plurality of the waves therein, transmitting the modified current over a line and separating the said groups and waves from each other, substantially as described.

7. The method of transmitting intelligence which consists in dividing the waves of an alternating electric current into groups, modifying one or more of such groups by suppressing a plurality of the waves therein, transmitting the modified current over a line, separating the said groups and waves from each other, and causing the current from one group to record intelligence independently of the currents from the other groups, substantially as described.

8. The method of transmitting intelligence which consists in suppressing the waves of an alternating electric current so that the character transmitted depends upon the number, position and sequence of the modified waves, transmitting said current over a line and periodically separating the modified current representing one character from that representing another character, substantially as described.

9. The method of transmitting intelligence which consists in grouping the waves of an alternating electric current, suppressing a plurality of said waves so that the number and position of the waves in each group will represent the character transmitted, transmitting the current over a line, periodically separating the waves of one group from the waves of the other groups and the waves of each group from each other whereby the character transmitted is recorded, substantially as described.

10. The method of transmitting intelligence which consists in dividing the waves of an alternating electric current having waves of equal length into groups, suppressing two waves in one or more of such groups so that the position of the suppressed waves will represent the character transmitted, substantially as described.

11. The method of transmitting intelligence which consists in dividing the waves of an alternating electric current having waves of equal lengths into groups, modifying two waves in one or more of such groups so that the position of the modified waves will represent the character transmitted, substantially as described.

12. The method of transmitting intelligence, which consists in dividing the waves of an alternating current of electricity into groups, and modifying two waves in one or more of such groups by leaving out the said waves, the position of the modified waves in the group representing the signal or letter, substantially as described.

13. The method of transmitting intelligence, which consists in dividing the waves of an alternating current of electricity having waves of equal length into groups and modifying two waves in one or more of such groups by cutting out the said waves, the position of the modified waves in the group representing the signal or letter, substantially as described.

14. In a system for the transmission of intelligence by means of alternating currents of electricity, the combination with a source of alternating signaling and synchronizing currents of electricity, of a synchronizing device regulated by the alternating current, and means independent of the alternating current for driving the said synchronizing device, substantially as described.

15. In a system for the transmission of intelligence by means of alternating currents, the combination with a source of alternating, signaling and synchronizing currents of electricity, of a plurality of synchronizing devices regulated by the alternating current, and means independent of the alternating current for driving the said synchronizing devices, substantially as described.

16. In a system for the transmission of intelligence by means of alternating currents of electricity, the combination with a source of alternating, signaling and synchronizing currents, and also a source of continuous current of electricity, of a synchronizing device regulated by the alternating current, and a continuous-current motor for driving the said synchronizing device, substantially as described.

17. In a system for the transmission of intelligence by means of alternating currents of electricity, the combination with a source of alternating, signaling and synchronizing currents, and also a source of continuous current of electricity, of a plurality of synchronizing devices regulated by the alternating current, and means operated by the continuous current for driving the said synchronizing devices, substantially as described.

18. The combination of a synchronizing device, provided with a field-magnet, an armature provided with a plurality of conductors, means for passing a continuous current of electricity through some of the conductors of said armature for driving the armature, means for passing an alternating current of electricity through other of the conductors of the armature for regulating the speed of said armature, a main-line conductor, and means for applying thereto an alternating electric current with its waves modified and in phase with the regulating alternating current, substantially as described.

19. In a synchronizing device, the combination with a field-magnet, of an armature having two sets of windings, one set for a continuous current of electricity and another for an alternating current, means for keeping the alternating current in synchronism with the main-line current, a source of continuous current, a source of alternating current with conductors therefrom, and a main-line conductor carrying an alternating current with its waves modified, substantially as described.

20. In a synchronizing device, the combination of a line conductor, a source of alternating currents of electricity and means for modifying the waves thereof, a field-magnet, a disk armature provided with a plurality of conductors, means for passing a continuous current of electricity through some of the conductors of said armature for driving the armature and for passing an alternating current through other of the conductors of the armature for regulating the speed of the said armature, and means for keeping the armature alternating current and the main-line current in synchronism with each other, substantially as described.

21. In a synchronizing device, the combination with a field-magnet, of a disk armature made of non-magnetic material provided with a plurality of conductors, means for passing a continuous current of electricity through some of the conductors for driving the armature, means for passing an alternating current of electricity through other of the conductors for regulating the speed of said armature and a main-line conductor carrying an alternating electric current, substantially as described.

22. In a synchronizing device, the combination with a field-magnet, of a disk armature provided with a plurality of conductors, means for passing a continuous current of electricity through some of the conductors for driving the armature, means for passing an alternating current of electricity through other of the conductors for regulating the speed of the said armature, a main-line conductor carrying an alternating electric current, and means for maintaining the main-line current and the current through the armature in synchronism with each other, substantially as described.

23. In a telegraph system, the combination with a source of alternating current of electricity, and means for modifying the waves or impulses of said current, of a synchronizing device, regulated by the alternating signaling-current, and a trailer and sunflower device regulated by the synchronizing device for separating out the modified alternating current, substantially as described.

24. In a telegraph system, the combination with a source of alternating currents of electricity for transmitting signals, and means for modifying the waves or impulses of said currents, of a synchronizing device regulated by the said alternating signaling-current, a trailer and sunflower device regulated by the synchronizing device and connected to the source of alternating currents, and adapted to separate out the modified waves and a signaling device operated by said modified waves, substantially as described.

25. In a system of telegraphy, the combination with a relay, of means for generating an alternating current of electricity having one or more of its impulses modified and means for passing the said current through the winding of the said relay, a synchronizing device regulated by the aforesaid alternating current, means for separating out the impulses of the said alternating current, a plurality of branch circuits conveying the said separated impulses, means for breaking the said branch circuits, a local circuit adapted to be opened and closed by the aforesaid relay, and a plurality of signaling devices in the said local circuit, substantially as described.

26. In a combination device for increasing the number of signals to be derived from a certain number of circuits, the combination with a series of circuits, a series of electromagnetic devices therein comprising fixed and movable coils, the fixed and movable coils in the several circuits being intergrouped in pairs and operated only by currents passing simultaneously through pairs of said circuits, substantially as described.

27. In a system of telegraphy, the combination with a source of alternating current of electricity and means for modifying the waves or impulses of said current, of a source of local electric current, a synchronizing device, a series of conducting-strips with brushes for taking the current therefrom, of a plurality of magnetic devices having two sets of windings, one set for the alternating line-current, and the other set for the local current, whereby the said device is caused to respond to the modified line impulses passing through one of its coils, substantially as described.

28. In a system of telegraphy, the combination with a source of alternating electric current, and means for modifying the waves or impulses of said current, of a source of continuous electric current and a local battery, a synchronizing device, a series of conducting-strips with brushes for taking the current therefrom, a plurality of magnetic devices having two sets of windings, one set for the alternating line-current and the other set for the local current, whereby the said device is caused to respond to the modified line impulses passing through one of its coils, substantially as described.

29. In a keyboard for the transmission of intelligence by modifying the impulses of an alternating current of electricity, the combination of a plurality of keys, a plurality of conducting-bows, a series of contact-points adapted to make contact with the said bows, levers engaging portions of the said bows, magnets operating said levers for preventing the contact between said points and bows from being broken except at certain equal intervals, substantially as described.

30. In a keyboard of the character described, the combination with a plurality of keys, of a plurality of conducting-bows, a series of contact-points adapted to make contact with the said bows, a series of lugs arranged upon the conducting-bows, a lever adapted to engage the said lugs, and an electromagnet actuating the said lever at such intervals as will not interfere with any other apparatus which may depend on the current through the keyboard for its action, substantially as described.

31. The combination with a plurality of magnetic devices provided with one movable coil and a plurality of fixed coils, of a disk provided with characters upon its periphery, means for revolving the said disk, means for arresting the rotation of said disk when one of the magnetic devices is operated, and means for passing a sheet or strip of paper before the said disk and printing the characters on the said paper, substantially as described.

32. The combination with a source of electricity, and an electromagnet, of a coil movable around an axis within the magnetic field of said magnet and adapted to control a printing device, and means for bringing the said coil back to its initial position after action, substantially as described.

33. The combination with an electromagnet of a coil mounted on a shaft and movable around an axis within the magnetic field, arms rigidly attached to the said shaft, rods pivotally connected to the said arms, and means for bringing said movable coil back to its original position after action, substantially as described.

34. The combination with an electromagnet provided with two exciting-coils, of a coil mounted on a shaft and movable around an axis within the magnetic field, arms rigidly attached to the said shaft, rods pivotally connected to the said arms, and means for bringing said movable coil back to its original position after action, substantially as described.

35. The combination with an electromagnet provided with two exciting-coils wound in opposition to each other, of a coil mounted on a shaft and movable around an axis within the magnetic field, arms rigidly attached to the said shaft, rods pivotally connected to the said arms, and springs for bringing said movable coil back to its original position, substantially as described.

36. In a printing device for making the modified impulses, of an alternating current of electricity manifest in an intelligible form, the combination with a plurality of magnetic devices each provided with two fixed and one movable coil, of a base supporting the same, a metallic collar provided with a plurality of radial holes, a plurality of rods connected with the magnetic "combination devices" and each rod provided with a small lug, the said rods passing through the aforesaid radial holes, a single rod also passing through one of the aforesaid holes and connected to the armature of an electromagnet, a metallic band passing around the aforesaid metal collar and insulated therefrom, a type-wheel adapted to revolve in front of the aforesaid radial holes, means for rotating the said type-wheel, a printing-hammer, an electromagnet adapted to actuate the said hammer, and means for passing a roll of paper in front of said hammer, substantially as described.

37. In the relaying of an alternating current with one or more of its wave impulses modified, the combination with a polarized relay and an ordinary relay operated by the main-line circuit, of a relayed circuit adapted to have the polarity of the current therein changed by the said polarized relay and the modifications of the main-line current impressed on the said relayed current by the said ordinary relay, substantially as described.

38. In a device for indicating difference of phase of a line-current and synchronizing device, the combination with a main-line conductor, of two branch conductors, a synchronizing device and resistance in one branch, a dynamometer-coil and a resistance in the other branch, a second coil of said dynamometer connected to a point in each of the said branch circuits, the said dynamometer indicating the difference in phase of the line-current and synchronizing device, substantially as described.

39. The combination of an electric conductor carrying an alternating electric current having waves of equal length and certain of its waves suppressed, a continuously-moving synchronizing device regulated by the alternating current, a relay through which the impulses pass, and a local battery with its circuit passing through the local contact side of said relay, a brush and strips of metal, the said brush moving over and in contact with said strips by means of the synchronizing device, a system of polarized relays, with the said local-battery current passing through the said brush and strips and through said polarized relays, substantially as described.

40. The combination of an electric conductor carrying an alternating electric current having waves of equal length and certain of its waves suppressed, a continuously-moving synchronizing device regulated by the alternating current, a relay through which the impulses pass, and a local battery with its circuit passing through the local contact side of said relay, a brush and strips of metal, the said brush moving over and in contact with said strips by means of said synchronizing device, a system of relays with the said local-battery circuit passing therethrough and through said brush and strips, and a combination device operated by the said relays, substantially as described.

41. The combination of an electric conductor carrying an alternating electric current having waves of equal length and certain of its waves suppressed, a continuously-moving synchronizing device regulated by the alternating current, a relay through which the impulses pass, and a local battery with its circuit passing through the local contact side of said relay, a brush and strips of metal with the brush moving over and in contact with said strips by means of said synchronizing device, a system of relays with the said local-battery circuit passing therethrough and through said brush and strips, a combination device operated by the said local current, and a printer coöperating with said combination device, substantially as described.

42. The combination of a source of signaling synchronizing electric currents, a synchronizing device consisting of coils of wire moving in a magnetic field, driven by an independent source of power and regulated by the alternating signaling-current, a system of conducting-strips, a brush moving over said strips, and conductors whose resistance or other electrical properties may be altered at will connected to said strips, substantially as described.

43. In a system for transmission of intelligence by alternating currents of electricity, the combination with a source of signaling and synchronizing current, a synchronizing device consisting of a coil of wire moving in a magnetic field, and regulated by the alternating signaling-current and independent means for driving said coil substantially as described.

44. In a system of signaling or the transmission of intelligence, the combination with a source of alternating signaling and synchronizing electric currents, means for cutting out certain of the impulses of said currents, a synchronizing device regulated by the alternating signaling-current and independent means for driving the said synchronizing device, substantially as described.

45. In a telegraph system using an alternating electric current with the waves of equal length and certain of its waves suppressed, a continuously-moving synchronizing device regulated by the alternating signaling-current, a relay operated by said current and a local battery with its circuit passing through the local contact side of said relay, a plurality of conducting-strips, a brush moved over said strips by means of said synchronizing device, and a system of polarized relays with the said local circuit passing therethrough and through said brush and strips, substantially as described.

46. In a system for the transmission of signals or intelligence, the combination of a source of signaling, synchronizing and alternating electric current, a synchronizing device consisting of coils of wire moving in a magnetic field, driven by an independent source of power and regulated by the alternating current, a system of conducting-strips, a brush moving over said strips, and conductors whose resistance or other electrical properties may be altered at will connected to said strips, substantially as described.

47. The combination of a line conductor carrying an alternating electric current having its waves of equal length and certain of its waves suppressed, a continuously-moving synchronizing device regulated by the alternating current, a relay through which the impulses pass adapted to release its armature and close or open the local circuit for modified line-waves, and a local battery with its circuit passing through the local contact side of said relay, a plurality of conducting-strips, a brush moved over said strips by means of said synchronizing device, a system of relays with the said local circuit passing therethrough and through said brush and strips substantially as described.

48. The combination of a line conductor carrying an alternating electric current having its waves of equal length and certain of its waves suppressed, a continuously-moving synchronizing device regulated by the alternating current, a relay through which the impulses pass adapted to release its armature and close or open the local circuit for modified line-waves, and a local battery with its current passing through the local contact side of said relay, a plurality of strips of metal, a brush moved over said strips by means of said synchronizing device a system of polarized relays with the local circuit passing therethrough and through the said brush and strips and a combination device controlled by said relays, substantially as described.

49. The combination with a line conductor carrying an alternating electric current having its waves of equal length and certain of its waves suppressed, of a uniformly and continuously moving synchronizing-motor regulated by the said alternating current, a relay through which the impulses pass adapted to release its armature and close or open the local circuit for modified line-waves, and a local battery with its circuit passing through the local contact side of said relay, a plurality of metal strips, a brush moved over said strips by means of said synchronizing device and a system of relays with the said local circuit passing through said relays and through said brush and strips, substantially as described.

50. The combination with a line conductor carrying an alternating electric current having its waves of equal length and certain of its waves suppressed, of a uniformly and continuously moving synchronizing-motor regulated by the said alternating current, a relay through which the impulses pass, adapted to release its armature and close or open the local circuit for modified line-waves, and a local battery with its circuit normally closed through the local contact side of said relay, a plurality of metal strips, a brush moved over said strips by means of said synchronizing device, a system of relays with the local circuit passing through said relays and through said brush and strips, and a combination device operated by said relays, substantially as described.

51. The combination with a sunflower and trailer, of a plurality of keys, a plurality of conducting-bows through which the segment-circuits of said sunflower pass, a series of contact-points adapted to make contact with said bows, levers engaging portions of the said bows, magnets operating said levers for preventing the contact between said points and bows from being made except at certain intervals, substantially as described.

52. The combination with a sunflower and trailer, of a plurality of keys, a plurality of conducting-bows through which the segment-circuits of said sunflower device pass, a series of contact-points adapted to make contact with said bows, a series of lugs arranged upon said bows, a lever adapted to engage the said lugs and an electromagnet actuating the said lever at such intervals as will not interfere with any other apparatus which may depend on the current through the said circuits for its action, substantially as described.

53. In the transmission of intelligence by modifying the waves of an alternating electric current, the combination with a sunflower device and trailer, of a keyboard with the segment-circuits of said sunflower device passing through said keyboard, the said keyboard having one key for each letter or symbol adapted to modify the said alternating current by altering the electrical properties of said circuits in combination for each letter or symbol, and means for locking the keys at all times except at such times as will not interfere with any other apparatus which may depend on the current through the said circuits, substantially as described.

54. In a system of transmission of intelligence, the combination with a source of alternating electric current, of a sunflower device and trailer, a keyboard with the segment-circuits of said sunflower device passing through it, the said keyboard having one key for each letter or symbol adapted to modify the impulses of said current by altering the electrical properties of said circuits in combinations for each letter or symbol, means for locking the said keys at all times except at such times as will not interfere with any other apparatus which may depend on the current through the said circuits, a main-line conductor and a relay in the main-line circuit operated by the main-line current, and means controlled by said relay for receiving a message, substantially as described.

55. In a system of telegraphy, the combination with a source of alternating signaling and synchronizing electric currents, of a synchronizing device regulated by the alternating signaling-current, independent means for driving said synchronizing device, a sunflower and trailer regulated by said synchronizing device, the segments of said sunflower being devided into groups for the separation of the current-waves, substantially as described.

56. The combination of an electric conductor carrying an alternating electric current having waves of equal length and certain of its waves suppressed, a continuously-moving synchronizing device regulated by the alternating current, a relay through which the impulses pass, and a local battery with its circuit passing through the local contact side of said relay, a brush and strips of metal, the said strips being arranged in groups, the said brush moving over and in contact with said strips by means of the synchronizing device, a system of relays for each set or group of strips, with the said local-battery current passing through the said brush and strips and through said relays, substantially as described.

57. In the transmission of intelligence by modifying the waves of an alternating electric current, the combination with a sunflower device and trailer, the segments of said sunflower being divided into groups, of a plurality of keyboards each being electrically connected to a separate group of said segments, said keyboards each having one key for each letter or symbol adapted to modify the said alternating current by altering the electrical properties of said circuits in combination for each letter or symbol, and means for locking the keys at all times except at such times as will not interfere with any other apparatus which may depend on the current through the said circuits, substantially as described.

58. The combination of an electric conductor carrying an alternating electric current having waves of equal length and certain of its waves suppressed, a continuous-moving synchronizing device regulated by the alternating current, a relay through which the impulses pass, and a local battery with its circuit passing through the local contact side of said relay, a brush and strips of metal, the said strips being arranged in groups, the said brush moving over and in contact with said strips by means of the synchronizing device, a system of relays for each set or groups of strips, with the said local-battery current passing through the said brush and strips and through said relays, and a plurality of printers each printer being operated by a separate group of said relays, substantially as described.

In testimony whereof I affix my signature in presence of two witnesses.

HENRY A. ROWLAND.

Witnesses:
JOS. H. BLACKWOOD,
JOHN C. WILSON.